(12) United States Patent
Sung

(10) Patent No.: US 7,653,297 B2
(45) Date of Patent: Jan. 26, 2010

(54) AF LENS POSITION DETERMINATION SYSTEMS AND METHODS AND ANTI-DAZZLING SCREENS THEREOF

(75) Inventor: Yung-Chun Sung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 309 days.

(21) Appl. No.: 11/841,055

(22) Filed: Aug. 20, 2007

(65) Prior Publication Data

US 2008/0267604 A1    Oct. 30, 2008

(30) Foreign Application Priority Data

Aug. 23, 2006   (TW) .............................. 95130960 A (51) Int. Cl.
*G03B 17/00*   (2006.01)

(52) U.S. Cl. .......................................... 396/77; 396/87

(58) Field of Classification Search ................... 396/77, 396/87

See application file for complete search history.

(56) References Cited

U.S. PATENT DOCUMENTS

2009/0180772 A1*   7/2009   Ichimiya ...................... 396/96

* cited by examiner

*Primary Examiner*—Rodney E Fuller
(74) *Attorney, Agent, or Firm*—Thomas, Kayden, Horstemeyer & Risley (57) ABSTRACT

AF lens position determination systems and methods. The system comprises an anti-dazzling screen, a sensor and a processing module. The anti-dazzling screen comprises first and second areas. The length of a respective covered sub-area in the first area is a first distance, and the length of a respective uncovered sub-area in the first area increases progressively from the center to a first border of the anti-dazzling screen. The length of a respective uncovered sub-area in the second area is a second distance, and the length of a respective covered sub-area in the second area increases progressively from the center to a second border of the anti-dazzling screen. The sensor moves within a range, and generates high and low signals based on the anti-dazzling screen. The processing module determines the position of an AF lens according to the signals generated by the sensor.

16 Claims, 7 Drawing Sheets

AF LENS POSITION DETERMINATION SYSTEMS AND METHODS AND ANTI-DAZZLING SCREENS THEREOF

BACKGROUND OF THE INVENTION

1. Field of the Invention

The disclosure relates generally to AF systems and methods, and, more particularly to systems and methods that determine the position of an AF lens, and anti-dazzling screens thereof.

2. Description of the Related Art

Recently, digital cameras with image sensors such as charge coupled device (CCD) or complementary metal oxide semiconductor (CMOS) have gradually replaced conventional film cameras, due to ease of review and processing of captured images in related devices such as computers.

Figure 1:
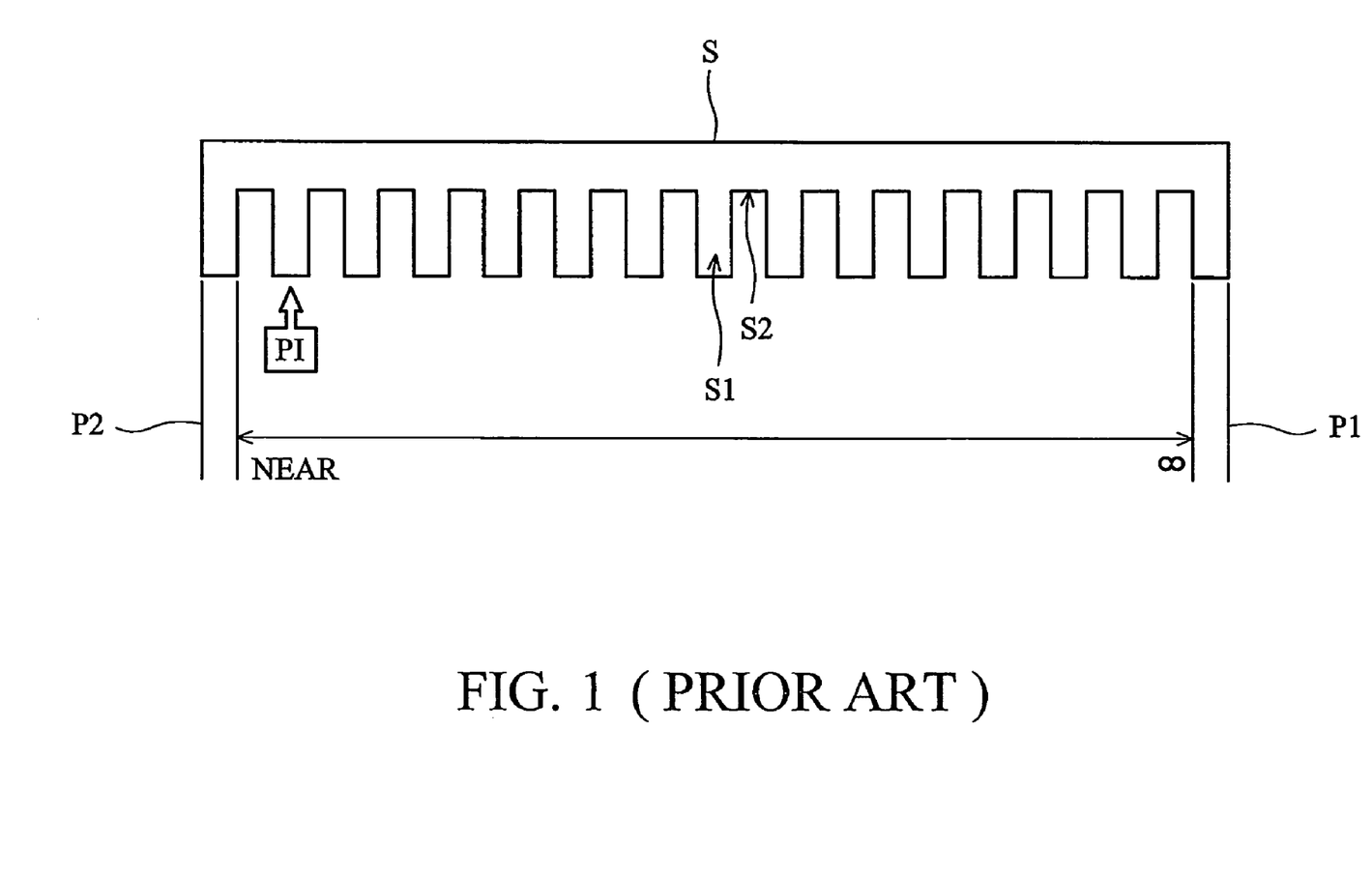
FIG. 1 shows a relationship between an anti-dazzling screen and a sensor for conventional auto-focusing procedures.

Generally, digital cameras provide an auto-focus (AF) capability. FIG. 1 shows a relationship between an anti-dazzling screen and a sensor for conventional auto-focusing procedures. Conventionally, since the position of the AF lens cannot be initially determined, sensor Pl must first optically home in to a mechanism origin (P1 or P2), such as the near end (NEAR) or the infinite far end ($\infty$). Then, the auto-focusing procedure is performed. When the sensor Pl moves within a focus range, the sensor Pl generates high and low signals based on the design of the anti-dazzling screen S. When the sensor Pl is at a covered sub-area such as S1 of the anti-dazzling screen S, the sensor Pl detects and generates low signals. When the sensor Pl is at an uncovered sub-area such as S2 of the anti-dazzling screen S, the sensor Pl detects and generates high signals.

Conventionally, the lengths of the respective covered and uncovered sub-areas are the same. When digital cameras boot or reset, the sensor Pl will first home in to the mechanism origin (P1 or P2) to ensure the starting position of the sensor Pl. This takes time.

Meanwhile, if the sensor Pl is out of control during auto-focus, the auto-focusing procedure may fail. Additionally, if the sensor Pl homes in to an origin beyond the range of the anti-dazzling screen S, the digital camera will crash due to no detection of the anti-dazzling screen S. Further, if the digital camera system crashes or the drive mechanism malfunctions, the sensor Pl will first home in to the mechanism origin (P1 or P2) to re-ensure the starting position of the sensor Pl. The homing of the sensor Pl is time-consuming.

BRIEF SUMMARY OF THE INVENTION

AF lens position determination systems and methods and anti-dazzling screens thereof are provided.

An embodiment of an AF lens position determination system comprises an anti-dazzling screen, a sensor and a processing module. The anti-dazzling screen comprises first and second areas. The length of a respective covered sub-area from a first border to a second boarder of the first area according to a first function, and the length of a respective uncovered sub-area from the first border to the second boarder according to a second function. The length of a respective uncovered sub-area from a third border to a fourth boarder of the second area according to a third function, and the length of a respective covered sub-area from the third border to the fourth boarder according to a fourth function. The sensor moves within a range, and generates high and low signals based on the covered sub-areas and the uncovered sub-areas of the anti-dazzling screen. The processing module determines a position of the AF lens according to the high and low signals generated by the sensor.

In an embodiment of an AF lens position determination method. Providing an anti-dazzling screen comprises first and second areas. The length of a respective covered sub-area from a first border to a second boarder of the first area according to a first function, and the length of a respective uncovered sub-area from the first border to the second boarder according to a second function. The length of a respective uncovered sub-area from a third border to a fourth boarder of the second area according to a third function, and the length of a respective covered sub-area from the third border to the fourth boarder according to a fourth function. Employing a sensor moves within a range, wherein the sensor generating first signals according to the covered sub-areas of the anti-dazzling screen, and generating second signals according to the uncovered sub-areas of the anti-dazzling screen. The position of the AF lens is determined according to a distance corresponding to a period of the first and second signals generated by the sensor.

An embodiment of an anti-dazzling screen comprises first and second areas. The length of a respective covered sub-area from a first border to a second boarder of the first area according to a first function, and the length of a respective uncovered sub-area from the first border to the second boarder according to a second function. The length of a respective uncovered sub-area from a third border to a fourth boarder of the second area according to a third function, and the length of a respective covered sub-area from the third border to the fourth boarder according to a fourth function.

AF lens position determination systems and methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

AF lens position determination systems and methods and anti-dazzling screens thereof are provided.

Figure 2:
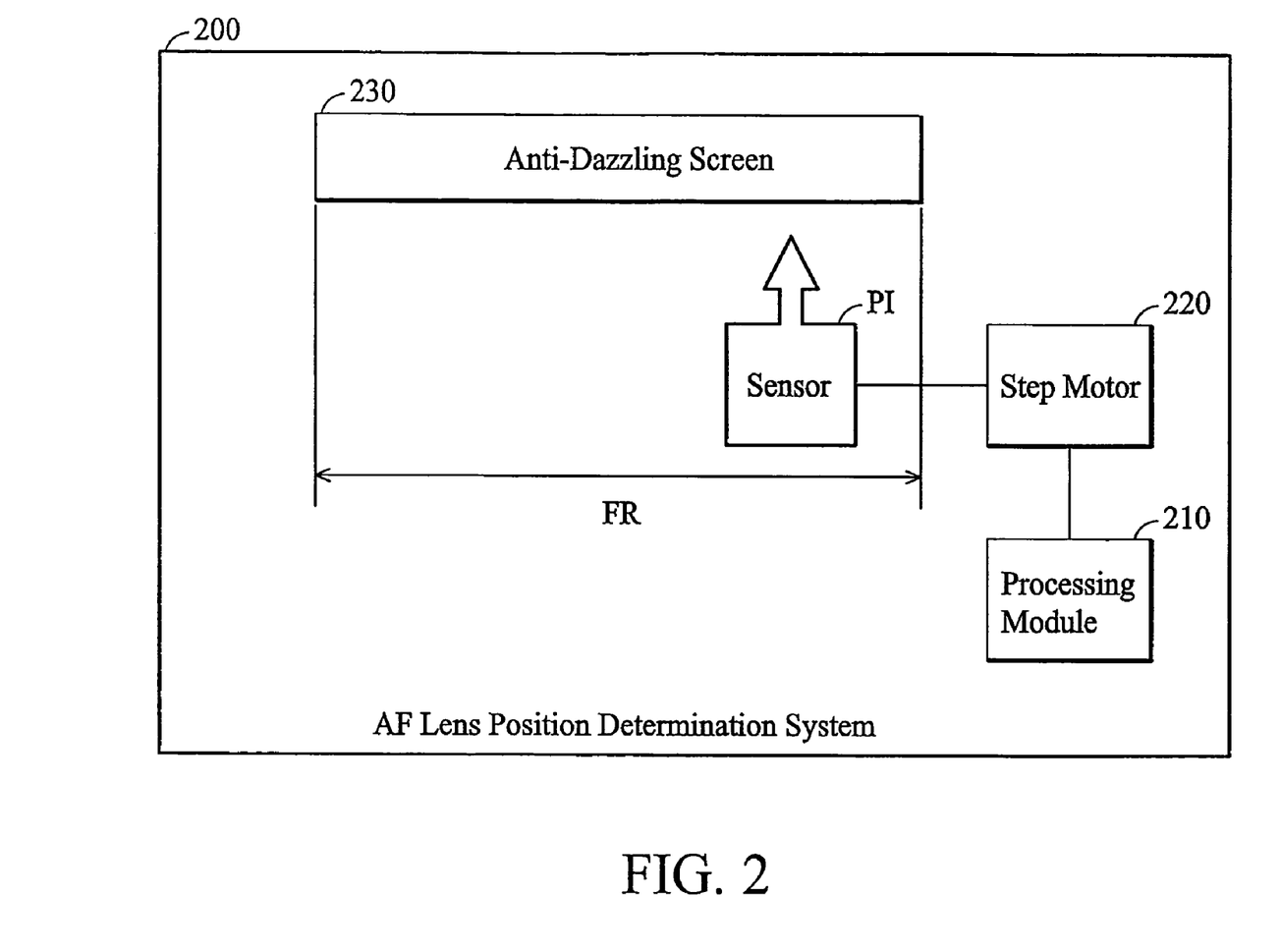
FIG. 2 is a schematic diagram illustrating an embodiment of an AF lens position determination system.

FIG. 2 is a schematic diagram illustrating an embodiment of an AF lens position determination system.

The AF lens position determination system 200 comprises a processing module 210, a step motor 220, an anti-dazzling screen 230, and a sensor Pl. The AF lens position determination system 200 may be a camera device, such as a digital camera or a digital telescope, or related devices requiring positioning adjustment. The step motor 220 drives the sensor Pl to move within a focus range FR. The sensor Pl generates high and low signals according to the specific design of the anti-dazzling screen 230. When the sensor Pl is at the respective covered sub-areas of the anti-dazzling screen 230, low signals are detected and obtained by the sensor Pl. When the sensor Pl is at the respective uncovered sub-areas of the anti-dazzling screen, high signals are detected and obtained by the sensor Pl. A more detailed description of the anti-dazzling screen 230 is discussed later. The processing module 210 receives signals from the sensor Pl to realize the distance moved by the sensor Pl accordingly, and perform the AF lens position determination method.

Figure 3:
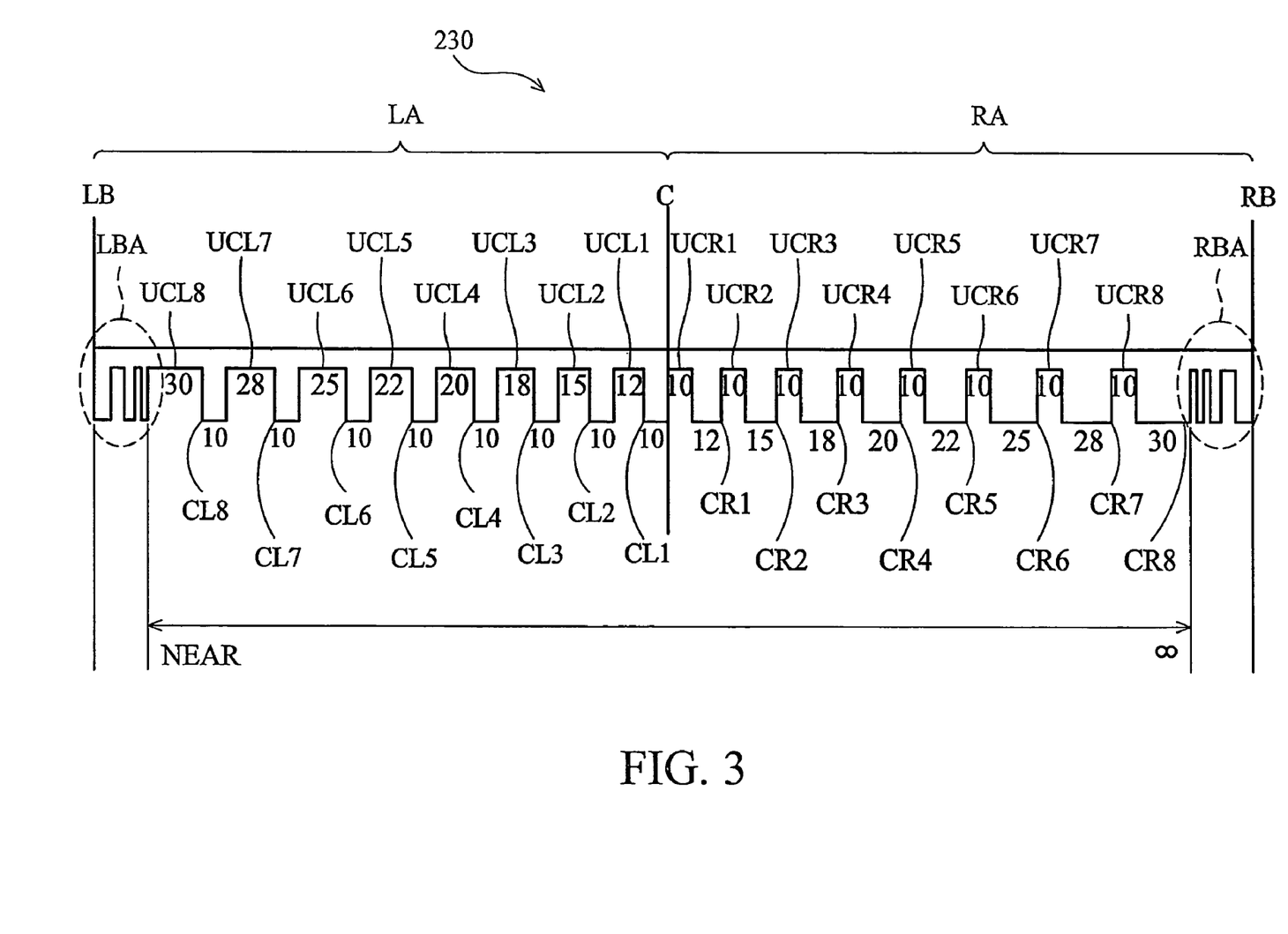
FIG. 3 is a schematic diagram illustrating an embodiment of an anti-dazzling screen.

FIG. 3 is a schematic diagram illustrating an embodiment of an anti-dazzling screen. As shown in FIG. 3, the anti-dazzling screen 230 has an asymmetric open edge design. The anti-dazzling screen 230 has a center C, and a left area LA and a right area RA.

The left area LA comprises 8 covered sub-areas CL1, CL2, CL3, CL4, CL5, CL6, CL7 and CL8, and 8 uncovered sub-areas UCL1, UCL2, UCL3, UCL4, UCL5, UCL6, UCL7 and UCL8. The length of a respective covered sub-area in the left area LA is a first distance, such as 10 steps. It is noted that, in this embodiment, the distance is represented by steps representing a length driven by the step motor 220 based on the steps. It is noted that the distance can be represented in any unit, and is not limited thereto. The lengths of the respective uncovered sub-areas in the left area LA are different. The length of a respective uncovered sub-area in the left area LA increases progressively from the center to a left border LB of the anti-dazzling screen. For example, the lengths of the uncovered sub-areas UCL1, UCL2, UCL3, UCL4, UCL5, UCL6, UCL7 and UCL8 are 12, 15, 18, 20, 22, 25, 28 and 30 steps, respectively.

The right area RA comprises 8 covered sub-areas CR1, CR2, CR3, CR4, CR5, CR6, CR7 and CR8, and 8 uncovered sub-areas UCR1, UCR2, UCR3, UCR4, UCR5, UCR6, UCR7 and UCR8. The length of a respective uncovered sub-area in the right area RA is a second distance, such as 10 steps. The length of the respective covered sub-area in the right area RA increases progressively from the center to a right border RB of the anti-dazzling screen. For example, the lengths of the covered sub-areas CR1, CR2, CR3, CR4, CR5, CR6, CR7 and CR8 are 12, 15, 18, 20, 22, 25, 28 and 30 steps, respectively.

Additionally, the left area LA further comprises a left border area LBA having at least one group of covered and uncovered sub-areas, where the length of the respective sub-area in the left border area LBA is less than that of the respective covered sub-area in the left area LA. Similarly, the right area RA further comprises a right border area RBA having at least one group of covered and uncovered sub-areas, where the length of the respective sub-area in the right border area RBA is less than that of the respective uncovered sub-area in the right area RA. A more detailed description of the border area is discussed later. It is understood that the lengths for the first and second distances, the uncovered sub-areas in the left area LA, and the covered sub-areas in the right area RA are examples of this embodiment, and are not limited thereto. Additionally, the shape of the anti-dazzling screen may be a bar style or a circle style.

Figure 4:
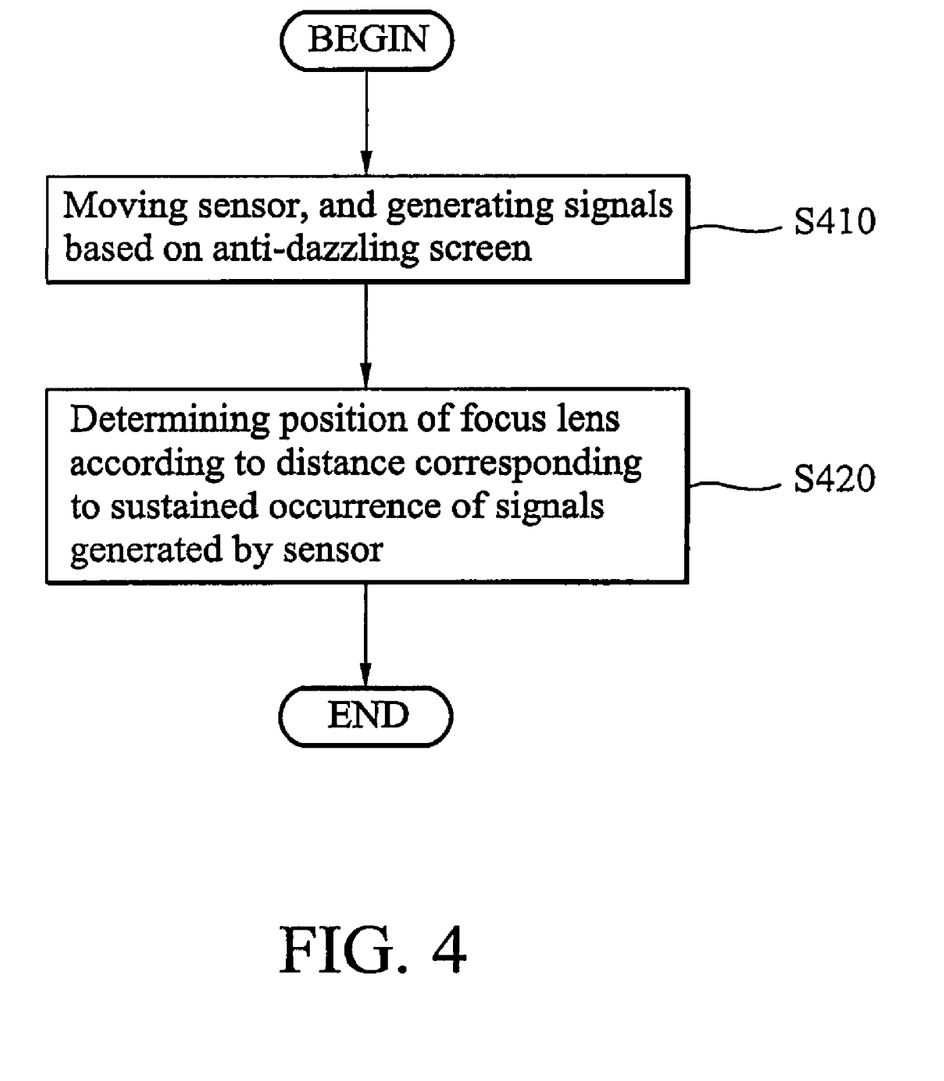
FIG. 4 is a flowchart of an embodiment of an AF lens position determination method.

FIG. 4 is a flowchart of an embodiment of an AF lens position determination method for use in a device such as a digital camera or a digital telescope comprising an anti-dazzling screen having an asymmetric open edge design. The anti-dazzling screen comprises first and second areas. The length of a respective covered sub-area in the left area is a first distance, and the length of a respective uncovered sub-area in the left area increases progressively from the center to the left border of the anti-dazzling screen. The length of a respective uncovered sub-area in the right area is a second distance, and the length of a respective covered sub-area in the right area increases progressively from the center to the right border of the anti-dazzling screen. First, in step S410, the step motor drives the sensor to move. Simultaneously, the sensor generates high and low signals based on the anti-dazzling screen. It is noted that if the sensor is at the respective covered sub-areas of the anti-dazzling screen, low signals are detected and obtained by the sensor. If the sensor is at the respective uncovered sub-areas of the anti-dazzling screen, high signals are detected and obtained by the sensor. In step S420, the position of the AF lens is determined according to the distance (steps) corresponding to the sustained occurrence of high and low signals generated by the sensor.

Figure 5:
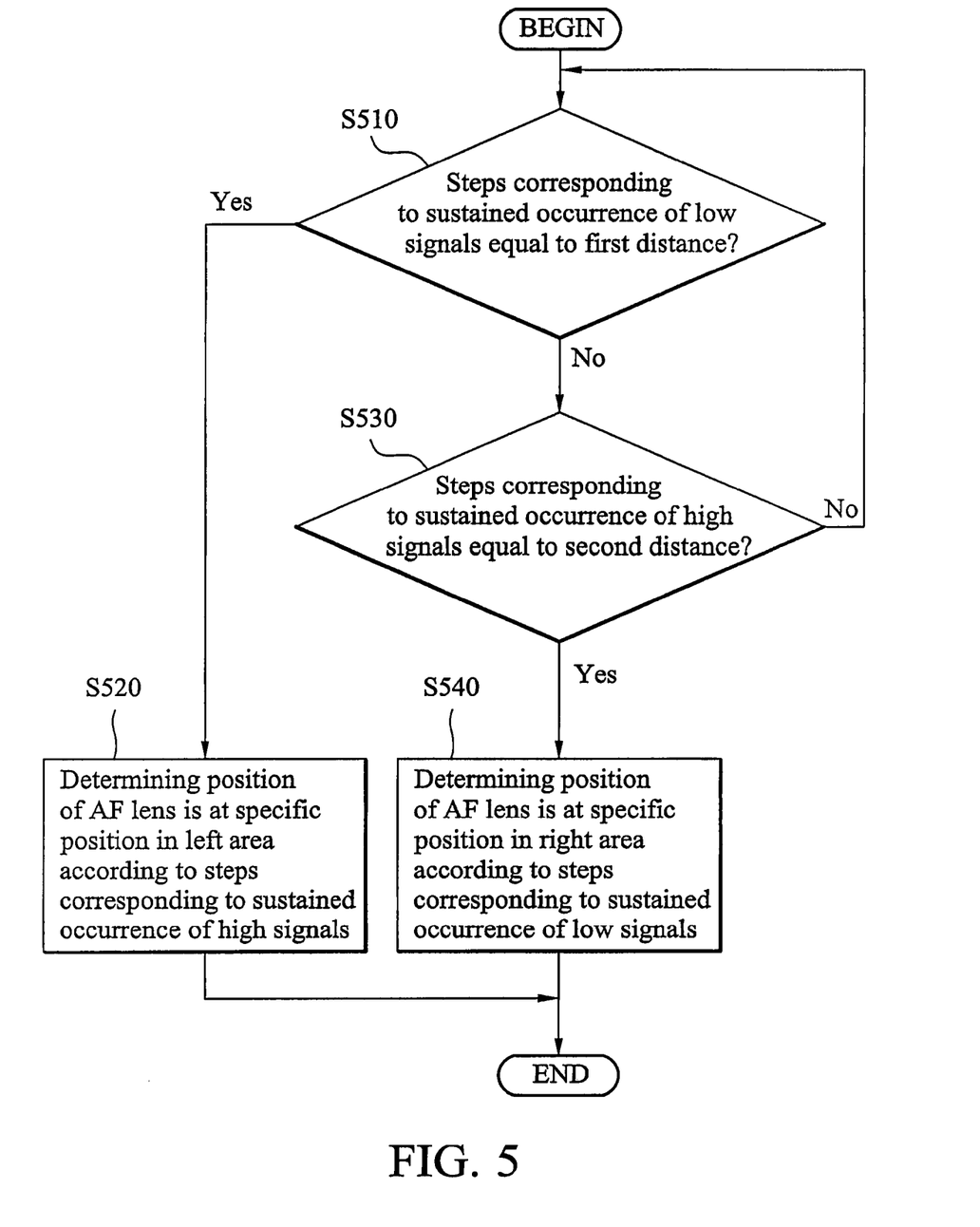
FIG. 5 is a flowchart of an embodiment of an AF lens position determination method.

FIG. 5 is a flowchart of an embodiment of an AF lens position determination method.

In step S510, it is determined whether the steps corresponding to the sustained occurrence of low signals equal to a first distance, such as 10 steps. If so (Yes in step S510), in step S520, it is determined whether the position of the AF lens is at a specific position in the left area of the anti-dazzling screen according to the steps corresponding to the sustained occurrence of high signals. If not (No in step S510), in step S530, it is determined whether the steps corresponding to the sustained occurrence of high signals equal to a second distance, such as 10 steps. If so (Yes in step S530), in step S540, it is determined whether the position of the AF lens is at a specific position in the right area of the anti-dazzling screen according to the steps corresponding to the sustained occurrence of low signals. If not (No in step S530), the procedure returns to step S510.

It is understood that, if the steps corresponding to the sustained occurrence of low signals equal to the first distance, the AF lens is in the left area of the anti-dazzling screen. Since the lengths of the respective uncovered sub-areas in the left area are different, the steps corresponding to the sustained occurrence of high signals can be used to determine the specific position of the AF lens in the left area. Similarly, if the steps corresponding to the sustained occurrence of high signals equal to the second distance, the AF lens is in the right area of the anti-dazzling screen. Since the lengths of the respective covered sub-areas in the right area are different, the steps corresponding to the sustained occurrence of low signals can be used to determine the specific position of the AF lens in the right area.

Figure 6:
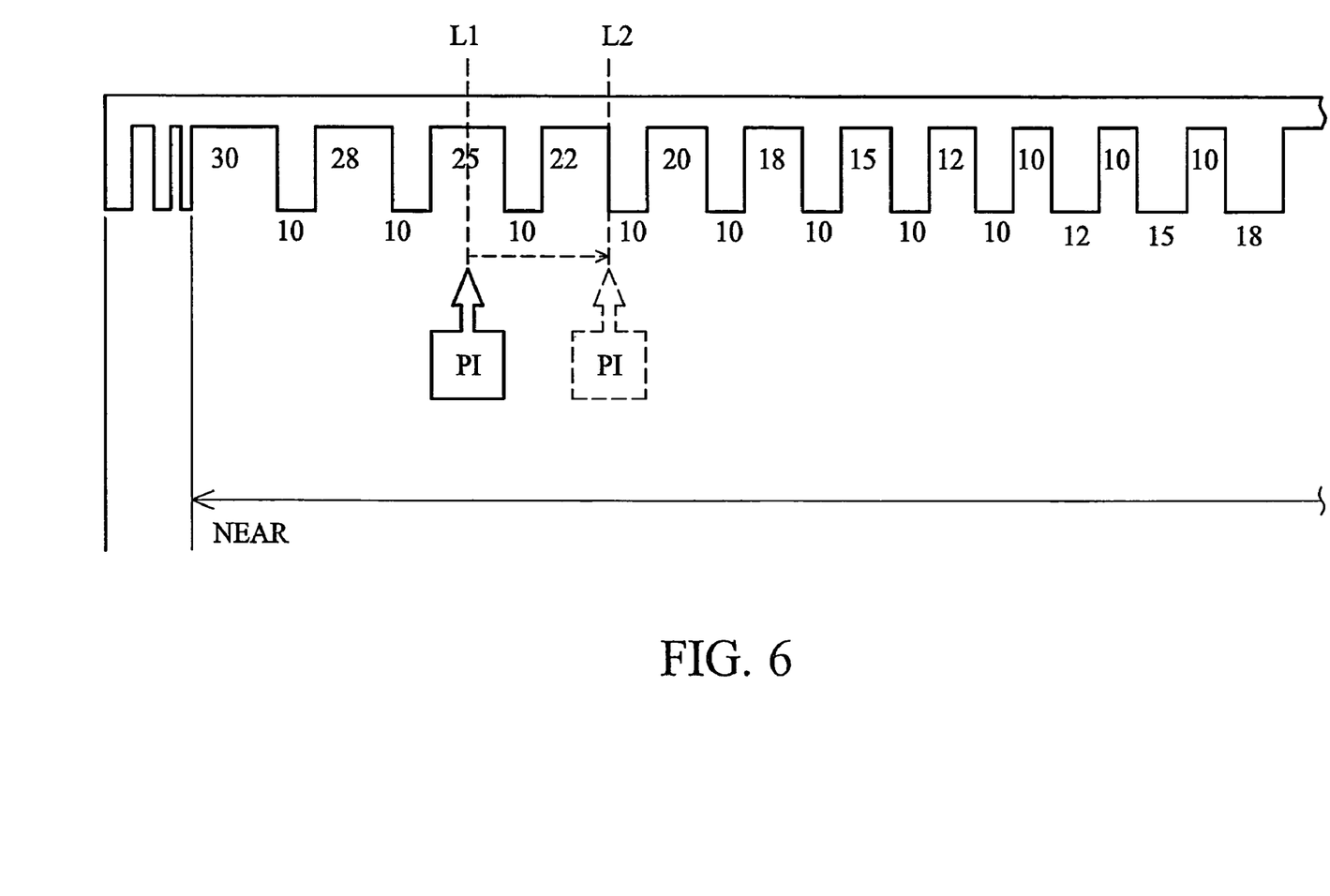
FIG. 6 is a schematic diagram illustrating an example of an AF lens position determination.

FIG. 6 is a schematic diagram illustrating an example of an AF lens position determination. In this example, during the movement of the sensor Pl from position L1 to L2, the sensor detects high signals of 12 steps, low signals of 10 steps, and high signals of 22 steps. When the low signals of 10 steps are detected, it is determined the AF lens is in the left area of the anti-dazzling screen. When the high signals of 22 steps are detected, the step number '22' can be used to determine the specific position of the AF lens in the left area of the anti-dazzling screen since the lengths of the respective uncovered sub-areas in the left area are different. In this example, the position of the AF lens is realized after the sensor Pl moves 44 (10+12+22) steps. When the position of the AF lens is realized, the search procedure for auto-focusing is performed directly from the position. Conventionally, the sensor would first optically home in to the infinite far end ($\infty$) or the near end (NEAR). The movement of the sensor is 409(500(total length)−91 (current position of sensor)=409) steps. 365(409−44=365) steps of time are saved in this example.

Figure 7:
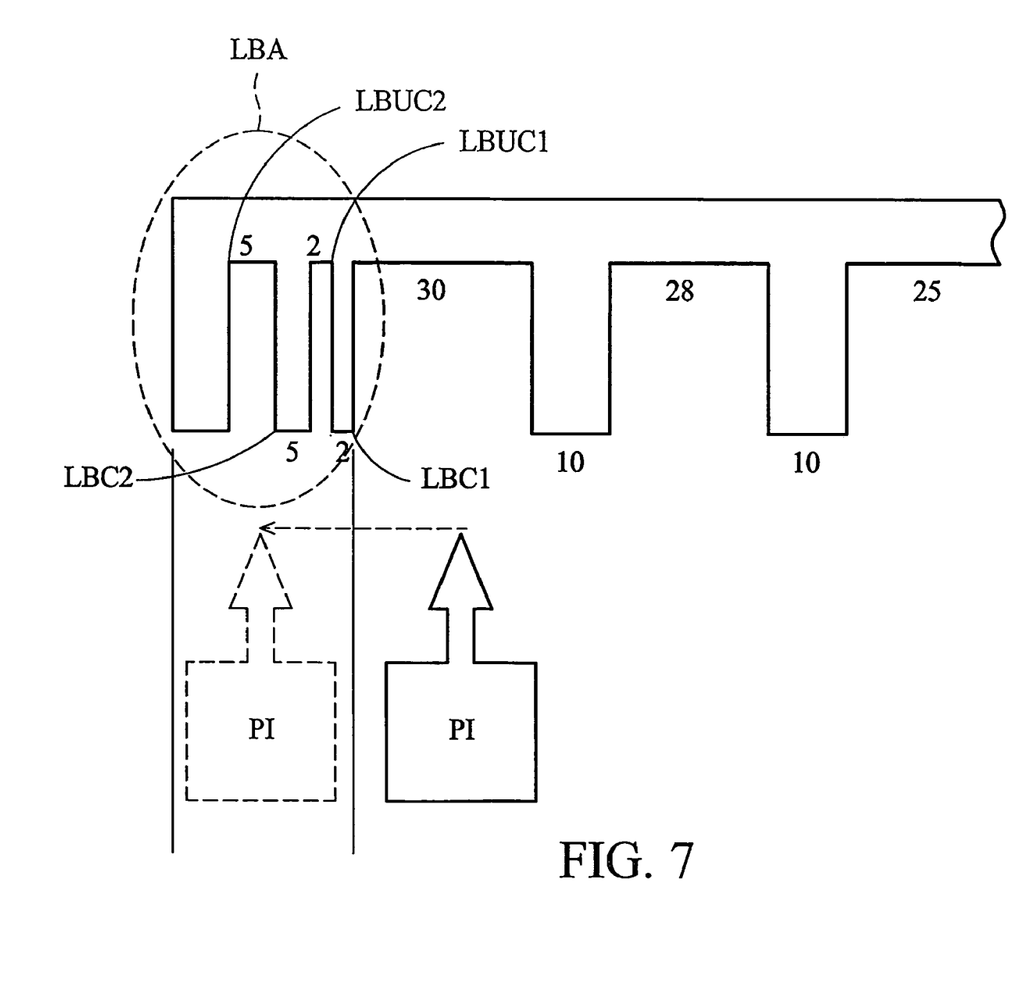
FIG. 7 is a schematic diagram illustrating an embodiment of the left border area of the anti-dazzling screen.

As described, the left area LA further comprises a left border area LBA having at least one group of covered and uncovered sub-areas, where the length of the respective sub-area in the left border area LBA is less than that of the respective covered sub-area in the left area LA, as shown in FIG. 3. FIG. 7 is a schematic diagram illustrating an embodiment of the left border area of the anti-dazzling screen. The left border area LBA has a first group of covered and uncovered sub-areas LBC1 and LBUC1. Additionally, the left border area LBA has a second group of covered and uncovered sub-areas LBC2 and LBUC2. In this embodiment, the lengths for the covered and uncovered sub-areas LBC1 and LBUC1 of the first group is 2, and the lengths for the covered and uncovered sub-areas LBC2 and LBUC2 of the second group is 5. The length of the respective sub-area (2 or 5) in the left border area LBA is greatly less than that of the respective covered sub-area (10) in the left area LA. Similarly, the right area RA may have a right border area RBA with a structure similar to the left border area LBA. The design of the anti-dazzling screen ensures the sensor and the AF lens will stay within the range of the anti-dazzling screen as required, and not move beyond the border of the anti-dazzling screen. The processing module determines whether the sensor Pl is in the border areas according to the signals detected by the sensor Pl.

In this embodiment, when low signals of 2 steps and high signals of 2 steps are detected, it is determined that the sensor Pl is in the left border area. When high signals of 2 steps and low signals of 5 steps are detected, it is determined that the sensor Pl is in the left border area. When low signals of 5 steps and high signals of 5 steps are detected, it is determined that the sensor Pl is in the left border area. When low signals of 2 steps, high signals of 2 steps, low signals of 5 steps, and high signals of 5 steps are detected, it is determined that the sensor Pl is in the left border area. When the steps corresponding to any combination of the respective high and low signals is less than 10 steps, it is determined that the sensor Pl is in the left border area.

Further, when high signals of 2 steps and low signals of 2 steps are detected, it is determined that the sensor Pl is in the right border area. When low signals of 2 steps and high signals of 5 steps are detected, it is determined that the sensor Pl is in the right border area. When high signals of 5 steps and low signals of 5 steps are detected, it is determined that the sensor Pl is in the right border area. When high signals of 2 steps, low signals of 2 steps, high signals of 5 steps, and low signals of 5 steps are detected, it is determined that the sensor Pl is in the right border area. When the steps corresponding to any combination of the respective high and low signals is less than 10 steps, it is determined that the sensor Pl is in the right border area.

In the embodiments, the position of the AF lens can be efficiently determined using the anti-dazzling screen with asymmetric open edges. After the position of the AF lens is determined, the search process for auto-focusing can be performed directly. Additionally, the border positions can be verified without additional border check switches, such that the sensor or the AF lens will not move beyond the border based on the design of the anti-dazzling screen.

AF lens position determination systems and methods, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Thus, the scope of the invention shall be defined and protected by the following claims and their equivalents.

What is claimed is:

1. An AF lens position determination system, comprising:
an anti-dazzling screen comprising first and second areas, where the length of a respective covered sub-area in the first area from a first border to a second boarder of the first area is determined according to a first function, and the length of a respective uncovered sub-area in the first area from the first border to the second boarder of the first area is determined according to a second function, the length of a respective uncovered sub-area in the second area from a third border to a fourth boarder of the second area is determined according to a third function, and the length of a respective covered sub-area in the second area from the third border to the fourth boarder of the second area is determined according to a fourth function, wherein the first function and the second function are different, and the third function and the fourth function are different;
a sensor moving within a range, and generating low and high signals based on the covered sub-areas and the uncovered sub-areas of the anti-dazzling screen; and
a processing module determining a position of an AF lens according to the low signals and high signals generated by the sensor.

2. The system of claim 1 wherein the length of the respective covered sub-area in the first area is a first distance, and the length of the respective uncovered sub-area in the first area increases progressively from a center to a first end of the anti-dazzling screen according to the second function.

3. The system of claim 2 wherein the length of the respective uncovered sub-area in the second area is a second distance, and the length of the respective covered sub-area in the second area increases progressively from the center to a second end of the anti-dazzling screen according to the fourth function.

4. The system of claim 3 wherein the anti-dazzling screen further comprises a border area comprising at least a set of the covered and uncovered sub-areas, where the length of the uncovered sub-area is a third distance, and the length of the covered sub-area is a fourth distance.

5. The system of claim 4 wherein the processing module further determining whether the distance corresponding to a period of the low signals equal to the first distance, if so, presuming the AF lens located in the first area, and determining the AF lens is at a specific position of the first area according to the distance corresponding to the period of the high signals; determining whether the distance corresponding to the period of the high signals equal to the second distance, if so, presuming the AF lens located in the second area, and determining the AF lens is at the specific position of the second area according to the distance corresponding to the period of the low signals; and determining whether the distance corresponding to the periods of the high and low signals respectively equal to the third distance and the fourth distance, if so, presuming the AF lens located in the border area.

6. An AF lens position determination method, comprising:
providing an anti-dazzling screen comprising first and second areas, where the length of a respective covered sub-area in the first area from a first border to a second boarder of the first area is determined according to a first function, and the length of a respective uncovered sub-area in the first area from the first border to the second boarder of the first area is determined according to a second function, the length of a respective uncovered sub-area in the second area from a third border to a fourth boarder of the second area is determined according to a third function, and the length of a respective covered sub-area in the second area from the third border to the fourth boarder of the second area is determined according to a fourth function, wherein the first function and the second function are different, and the third function and the fourth function are different;
employing a sensor moving within a range, wherein the sensor generating first signals according to the covered sub-areas of the anti-dazzling screen, and generating second signals according to the uncovered sub-areas of the anti-dazzling screen; and
determining a position of the AF lens according to a distance corresponding to a period of the first and second signals generated by the sensor.

7. The method of claim 6 wherein the length of the respective covered sub-area in the first area is a first distance, and the length of the respective uncovered sub-area in the first area increases progressively from a center to a first end of the anti-dazzling screen according to the second function.

8. The method of claim 7 wherein the length of the respective uncovered sub-area in the second area is a second distance, and the length of the respective covered sub-area in the second area increases progressively from the center to a second end of the anti-dazzling screen according to the fourth function.

9. The method of claim 8 further comprising determining whether the distance corresponding to the period of the first signals equal to the first distance, and if so, presuming the AF lens located in the first area of the anti-dazzling screen, and determining the AF lens is at a specific position of the first area according to the distance corresponding to the period of the second signals.

10. The method of claim 8 further comprising determining whether the distance corresponding to the period of the second signals equal to the second distance, and if so, presuming the AF lens located in the second area of the anti-dazzling screen, and determining the AF lens is at the specific position of the second area according to the distance corresponding to the period of the first signals.

11. The method of claim 6 wherein the anti-dazzling screen further comprises a border area comprising at least a set of the covered and uncovered sub-areas, where the length of the uncovered sub-area is a third distance, and the length of the covered sub-area is a fourth distance.

12. The method of claim 11 further comprising determining whether the distances corresponding to the periods of the first and second signals respectively equal to the third distance and the fourth distance, and if so, presuming the AF lens located in the border area.

13. An anti-dazzling screen, comprising:
a first area, where the length of a respective covered sub-area in the first area from a first border to a second boarder of the first area is determined according to a first function, and the length of a respective uncovered sub-area in the first area from the first border to the second boarder of the first area is determined according to a second function, wherein the first function and the second function are different; and
a second area, where the length of a respective uncovered sub-area in the second area from a third border to a fourth boarder of the second area is determined according to a third function, and the a length of a respective covered sub-area in the second area from the third border to the fourth boarder of the second area is determined according to a fourth function, wherein the third function and the fourth function are different.

14. The anti-dazzling screen of claim 13 wherein the length of the respective covered sub-area in the first area is a first distance, and the length of the respective uncovered sub-area in the first area increases progressively from a center to a first end of the anti-dazzling screen according to the second function.

15. The anti-dazzling screen of claim 14 wherein the length of the respective uncovered sub-area in the second area is a second distance, and the length of the respective covered sub-area in the second area increases progressively from the center to a second end of the anti-dazzling screen according to the fourth function.

16. The anti-dazzling screen of claim 13 further comprises a border area comprising at least a set of the covered and uncovered sub-areas, where the length of the uncovered sub-area equals to a third distance, and the length of the covered sub-area equals to a fourth distance.

* * * * *